US012356370B2

(12) United States Patent
Sha et al.

(10) Patent No.: US 12,356,370 B2
(45) Date of Patent: Jul. 8, 2025

(54) SYSTEM AND METHOD FOR SELECTING PAGING RESOURCES

(71) Applicant: ZTE CORPORATION, Guangdong (CN)

(72) Inventors: Xiubin Sha, Shenzhen (CN); Bo Dai, Shenzhen (CN); Ting Lu, Shenzhen (CN); Li Niu, Shenzhen (CN); Jie Tan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 410 days.

(21) Appl. No.: 18/088,099

(22) Filed: Dec. 23, 2022

(65) Prior Publication Data

US 2023/0126745 A1 Apr. 27, 2023

Related U.S. Application Data

(63) Continuation of application No. PCT/CN2020/138363, filed on Dec. 22, 2020.

(51) Int. Cl.
*H04W 68/02* (2009.01)
*H04W 36/00* (2009.01)
*H04W 52/02* (2009.01)

(52) U.S. Cl.
CPC ....... *H04W 68/02* (2013.01); *H04W 36/0016* (2013.01); *H04W 52/0232* (2013.01)

(58) Field of Classification Search
CPC ..... H04W 68/02; H04W 52/02; H04W 36/00; H04W 36/08; H04W 68/08; H04W 68/00; H04W 72/04; H04W 72/53; H04W 72/54; H04W 74/08; H04W 76/19; H04W 76/20; H04W 76/27; H04W 76/28; H04W 76/30; H04W 28/02; H04W 8/22; H04W 36/14;
(Continued)

(56) References Cited

U.S. PATENT DOCUMENTS 10,812,629 B2 * 10/2020 Park ................... H04W 8/08
10,855,814 B2 * 12/2020 Park ................... H04W 8/08
(Continued)

FOREIGN PATENT DOCUMENTS

CN 107734643 A 2/2018
CN 110351815 A 10/2019
(Continued)

OTHER PUBLICATIONS

Communication pursuant to Article 94(3) EPC for EP App. No. 20966317.8 dated Nov. 22, 2024 (6 pages).
(Continued)

*Primary Examiner* — Man U Phan
(74) *Attorney, Agent, or Firm* — Foley & Lardner LLP

(57) ABSTRACT

A system and method for wireless communication are disclosed herein. One embodiment includes a wireless communication node configuring a plurality of carriers and selecting one of the plurality of carriers for sending a paging message to a wireless communication device based on a Discontinuous Reception (DRX) parameter specific for the wireless communication device. An alternate embodiment includes a wireless communication device selecting one of a plurality of carriers for receiving a paging message to a wireless communication device based on a Discontinuous Reception (DRX) parameter specific for the wireless communication device.

20 Claims, 13 Drawing Sheets

(58) Field of Classification Search
CPC . H04W 48/18; H04L 5/00; H04L 1/00; H04L 1/16; H04L 25/02
USPC .......................................................... 370/329
See application file for complete search history.

(56) References Cited

U.S. PATENT DOCUMENTS

| | | | | |
|---|---|---|---|---|
| 11,418,998 | B2* | 8/2022 | Zee | H04W 48/12 |
| 11,425,683 | B2* | 8/2022 | Wang | H04W 68/02 |
| 11,490,291 | B2* | 11/2022 | Talebi Fard | H04W 36/0016 |
| 11,641,687 | B2* | 5/2023 | Yang | H04L 65/1016 |
| | | | | 370/329 |
| 12,101,821 | B2* | 9/2024 | Höglund | H04W 74/0833 |
| 12,170,979 | B2* | 12/2024 | Choe | H04W 68/005 |
| 2019/0124181 | A1 | 4/2019 | Park et al. | |
| 2019/0124572 | A1 | 4/2019 | Park et al. | |
| 2019/0320490 | A1* | 10/2019 | Liu | H04W 24/10 |
| 2020/0245180 | A1* | 7/2020 | Matsukawa | H04W 28/0215 |
| 2023/0247656 | A1* | 8/2023 | Sha | H04W 76/28 |
| 2023/0292184 | A1* | 9/2023 | Barac | H04W 36/32 |
| 2023/0337069 | A1* | 10/2023 | Shi | H04W 36/0011 |

FOREIGN PATENT DOCUMENTS

| | | |
|---|---|---|
| CN | 111901866 A | 11/2020 |
| EP | 3 668 207 A1 | 6/2020 |
| WO | WO-2011/102686 A2 | 8/2011 |
| WO | WO-2019/030938 A1 | 2/2019 |
| WO | WO-2022/077315 A1 | 4/2022 |

OTHER PUBLICATIONS

Extended EP Search Report on EP Appl No. 20966317.8 dated Jun. 15, 2023 (9 pages).
LG Electronics, et al., "Support of NR V2X over NG", 3GPP TSG-RAN WG3, Meeting #108-e, R3-204438, e-Meeting, Jun. 24, 2020 (56 pages).
Ericsson, "UE identity to calculate PF and PO", 3GPP TSG-RAN2 Meeting #103bis, R2-1814515, Oct. 12, 2018, Chengdu, China (3 pages).
Office Action for JP Appl. No. 2022-581460, dated Jan. 10, 2024 (with English translation, 9 pages).
3rd Generation Partnership Project; Technical Specification Group Radio Access Network; NG-RAN; NG Application Protocol (NGAP) (Release 15), 3GPP TS 38.413 V15.9.0 (Sep. 2020), 332 pages.
Communication pursuant to Article 94(3) EPC for EP Appl. No. 20966317.8, dated Sep. 4, 2024 (7 pages).
International Search Report and Written Opinion for PCT Appl. No. PCT/CN2020/138363, mailed Sep. 26, 2021 (8 pages).
Sequans Communications: "NB-IoT UE specific DRX—Efficiency Issues" 3GPP TSG-RAN WG2 Meeting #108; R2-1916236; Nov. 18, 2019; Reno, USA (5 pages).
Sequans Communications: "NB-IoT UE specific DRX—Efficiency Issues" 3GPP TSG-RAN WG2 Meeting #109-e; R2-2001630; Mar. 6, 2020; Elbonia (10 pages).
First Office Action for CN Appl. No. 202311310788.1, dated Apr. 10, 2024 (with English translation, 15 pages).
LG Electronics Inc., "Discussion on paging assistance information in RRC-INACTIVE state", 3GPP TSG-RAN WG3 Meeting #97bis, R3-173871, Oct. 13, 2017, Prague, Czech Republic (10 pages).
Nokia et al., "Completion of paging in TS38.413", 3GPP TSG-RAN WG3#100, R3-182603, May 25, 2018, Busan, Korea (6 pages).
Second Office Action for CN Appl. No. 202311310788.1, dated Jul. 10, 2024 (with English translation, 8 pages).

* cited by examiner

SYSTEM AND METHOD FOR SELECTING PAGING RESOURCES

CROSS-REFERENCE TO RELATED APPLICATION

This application claims the benefit of priority under 35 U.S.C. § 120 as a continuation of PCT Patent Application No. PCT/CN2020/138363, filed on Dec. 22, 2020, the disclosure of which is incorporated herein by reference in its entirety.

TECHNICAL FIELD

The disclosure relates generally to wireless communications and, more particularly, to systems and methods for selecting paging radio resources and receiving system information.

BACKGROUND

A base station (BS) may transmit paging information to a user equipment (UE). In narrowband internet of things (NB-IoT) and Long Term Evolution (LTE), the UE may be in one of two radio resource control (RRC) states; an active or connected state (RRC_Connected) or an idle state (RRC_Idle). In enhanced machine type communication (eMTC), enhanced LTE (eLTE), and New Radio (NR), the UE may be in one of three RRC states; RRC_Connected, RRC_Idle, and an inactive state (RRC_Inactive). The UE discontinuously monitors the physical downlink control channel (PDCCH) to check for paging messages.

SUMMARY

The example implementations disclosed herein are directed to solving the issues relating to one or more of the problems presented in the prior art, as well as providing additional features that will become readily apparent by reference to the following detailed description when taken in conjunction with the accompany drawings. In accordance with various implementations, example systems, methods, devices and computer program products are disclosed herein. It is understood, however, that these implementations are presented by way of example and are not limiting, and it will be apparent to those of ordinary skill in the art who read the present disclosure that various modifications to the disclosed implementations can be made while remaining within the scope of this disclosure.

In one implementation, a method performed by a wireless communication node includes configuring a plurality of carriers and selecting one of the plurality of carriers for sending a paging message to a wireless communication device based on a Discontinuous Reception (DRX) parameter specific for the wireless communication device.

The method performed by the wireless communication node may further include selecting the carrier for sending the paging message based on respective DRX parameters of the plurality of carriers.

In another implementation, a method performed by a wireless communication device includes selecting one of a plurality of carriers for receiving a paging message to a wireless communication device based on a Discontinuous Reception (DRX) parameter specific for the wireless communication device.

The method performed by the wireless communication device may further include selecting the carrier for receiving the paging message based on respective DRX parameters of the plurality of carriers.

The above and other aspects and their implementations are described in greater detail in the drawings, the descriptions, and the claims.

BRIEF DESCRIPTION OF THE DRAWINGS

Various example implementations of the present solution are described in detail below with reference to the following figures or drawings. The drawings are provided for purposes of illustration only and merely depict example implementations of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE IMPLEMENTATIONS

Various example implementations of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example implementations and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1:
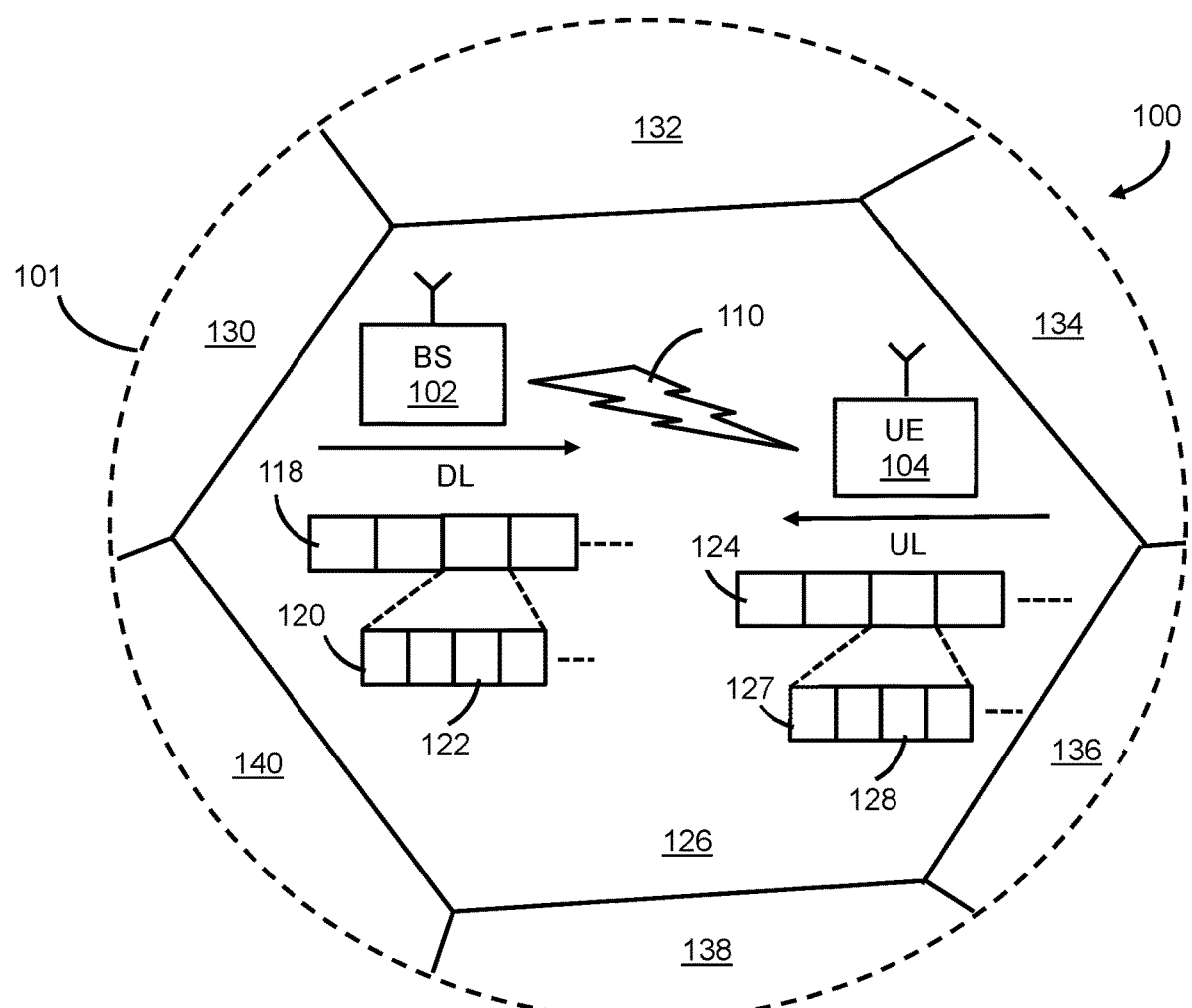
FIG. 1 illustrates an example cellular communication network in which techniques and other aspects disclosed herein may be implemented, in accordance with an implementation of the present disclosure.

FIG. 1 illustrates an example wireless communication network, and/or system, 100 in which techniques disclosed herein may be implemented, in accordance with an implementation of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various implementations of the present solution.

Figure 2:
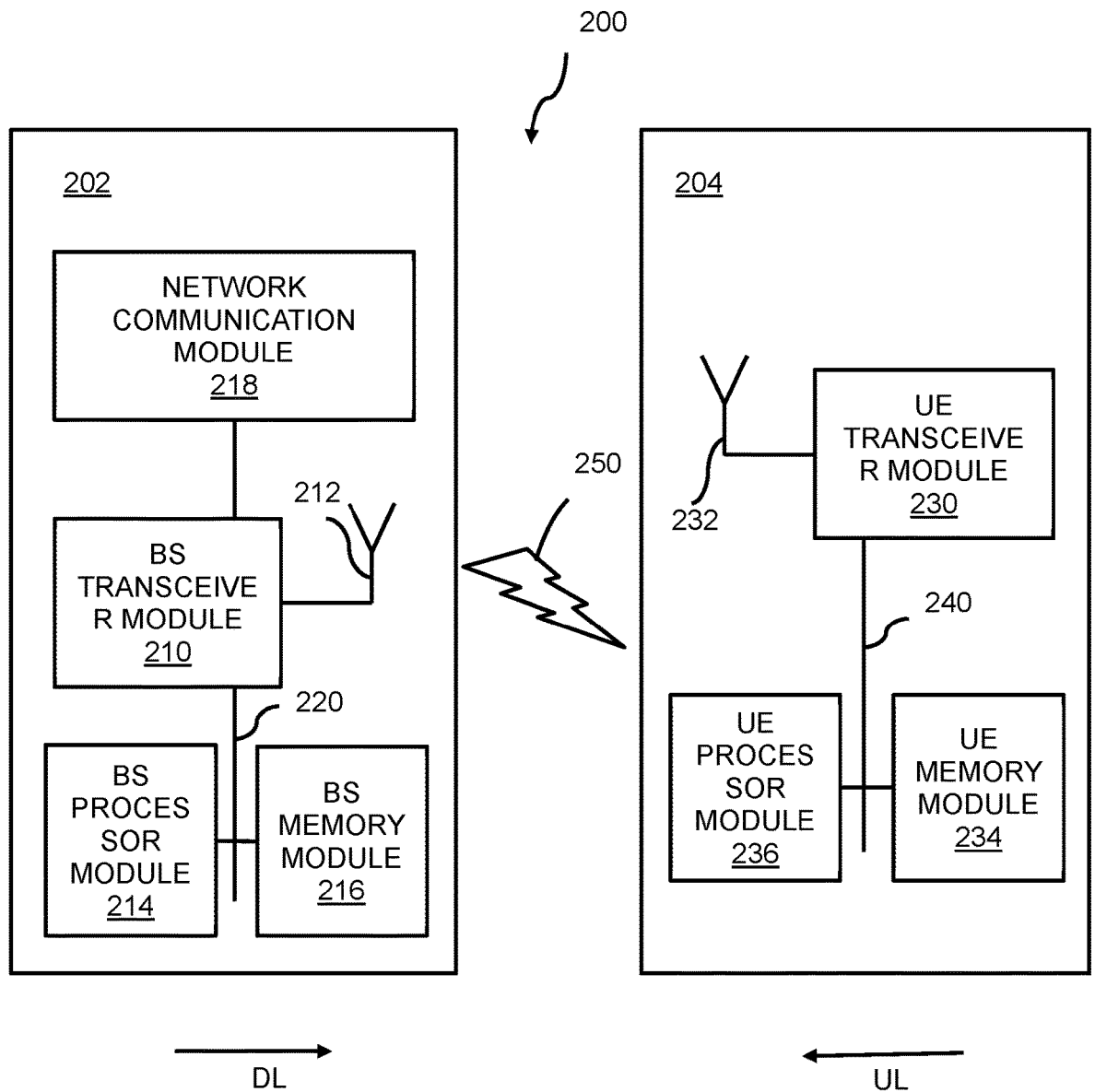
FIG. 2 illustrates block diagrams of an example base station and a user equipment device, in accordance with some implementations of the present disclosure.

FIG. 2 illustrates a block diagram of an example wireless communication system 200 for transmitting and receiving wireless communication signals, e.g., OFDM/OFDMA signals, in accordance with some implementations of the present solution. The system 200 may include components and elements configured to support known or conventional operating features that need not be described in detail herein. In one illustrative implementation, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the implementations disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some implementations, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some implementations, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some implementations, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative implementations, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various implementations, the BS 202 may be an evolved node B (eNB), a serving eNB, a target eNB, a femto station, or a pico station, for example. In some implementations, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the implementations disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some implementations, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

A BS that pages a UE may not know the paging capabilities of the UE. In the event a radio resource control (RRC) connection is established, the UE may be in the RRC state RRC_Connected. In the event the UE supports NR, the UE may be connected in a RRC_Inactive state in the event the RRC connection is suspended. In the event that no RRC connection is established, the UE may be in the RRC_Idle state. Accordingly, the BS may not know whether the UE is in RRC_Idle or RRC_Inactive. Thus, the BS may not know when to transmit paging information. Additionally or alternatively, the BS may not know whether the UE supports wakeup signals (WUS) or group wakeup signals (GWUP). The UE may discontinuously monitor the physical downlink control channel (PDCCH) to check for the transmitted paging messages.

A. Paging Procedure

A UE may move between cells of a radio access network (RAN) (or other network) such that various BS in various cells service the UE. A BS (e.g., a target RAN node) may learn the UE's paging capability when (1) the UE switches to the BS from the prior BS (e.g., the source RAN node), (2) the UE restores a RRC connection with the new BS or (3) the UE establishes a RRC connection with the new BS.

An Access and Mobility Management Function (AMF), operating during the handover process, may be responsible for handling the Next Generation Application Protocol (NGAP) to facilitate UE handover signaling on a NGAP interface. The UE capability for paging may be carried in handover signaling of the NGAP interface during a handover process. In one configuration, the UE paging capability may be directly included in the related signaling. In another configuration, the UE paging capability may be included in the paging capability container such as an RRC UE Radio Paging Information message. The container may be included in related signaling. In another configuration, the UE paging capability (or the paging capability container) may be included in the Core Network Assistance Information for RRC_Inactive cells carried in related signaling. In another configuration, the UE paging capability (or the paging capability container) may be included in a handover command container carried in related signaling. For instance, a RRC handover command message.

The UE capability for paging may include at least one of: UE category, coverage enhancement (CE) modeA support capability, ce-ModeB support capability, WUS support capability, WUS and extended discontinuous reception time (eDRX) configurations (e.g., a minimum gap between paging occasions (POs) defined by WakeUpSignalMinGap-eDRX), GWUS support capability, GWUS frequency hopping support (e.g., groupWakeUpSignalAlternation), multi-carrier support capability multi-band support capability, paging band support capability, mixed carrier paging support capability, and the like.

The BS may use the UE capability for paging to select paging resources.

Figure 3:
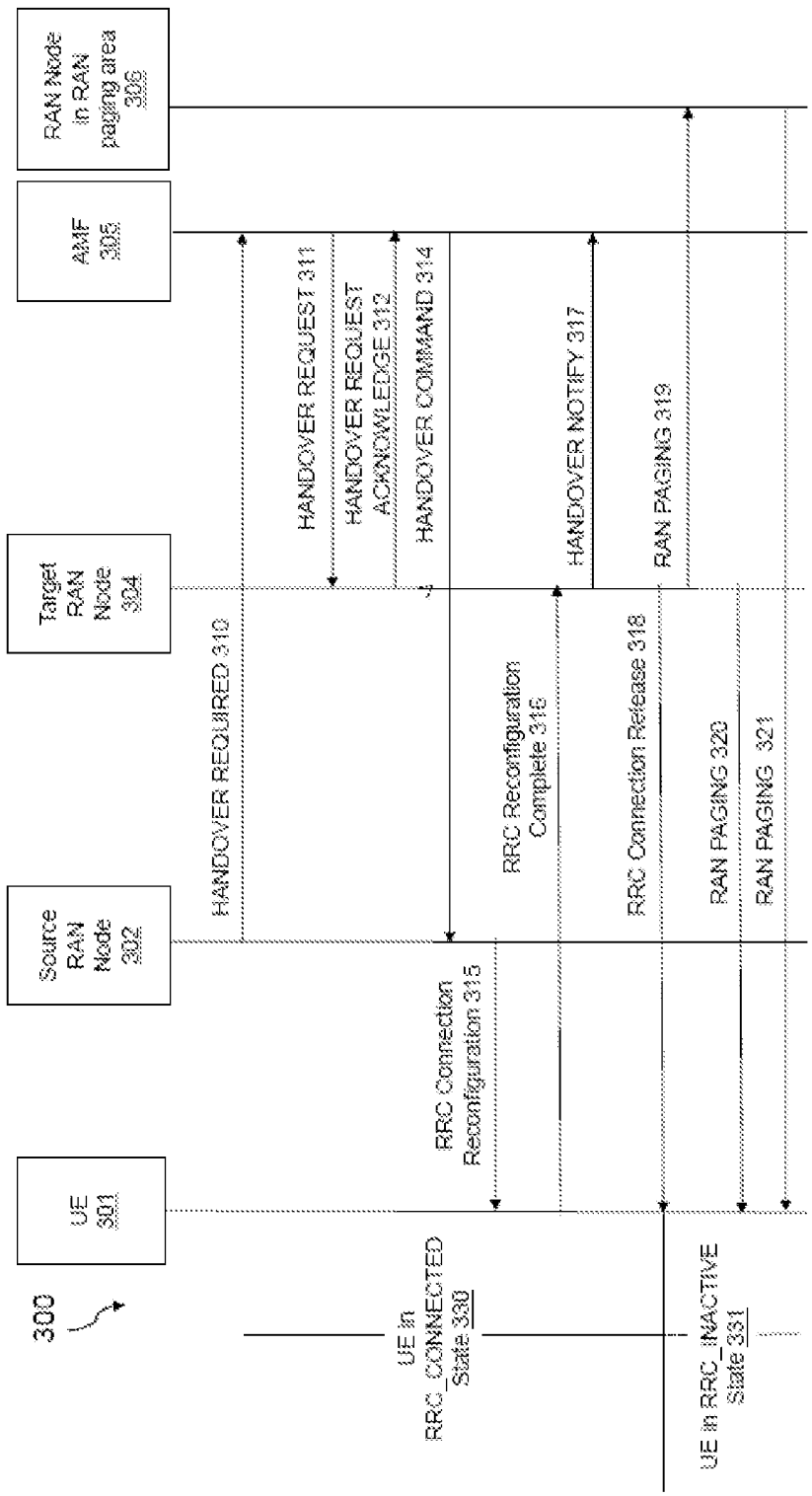
FIG. 3 illustrates a timing diagram of handover signaling without an Xn interface, in accordance with some implementations of the present disclosure.

FIG. 3 illustrates a timing diagram 300 of handover signaling without an Xn interface, in accordance with some implementations of the present disclosure. As shown, the source RAN node 302 may determine to handover UE 301 by transmitting a handover request 310 to AMF 305. The handover request 310 may include the UE 301 paging capabilities. The AMF 305 may transmit a handover request 311 to the target RAN node 304. The handover request 311 may include the UE 301 paging capabilities. The target RAN node 304 may acknowledge the request by transmitting a handover request acknowledge 312 to the AMF 305. The AMF 305 may transmit a handover command 314 to the source RAN node 302. The source RAN node 302 may prepare the UE 301 for handover by transmitting a RRC connection reconfiguration 315 signal. The UE 301 may receive the RRC connection reconfiguration 315 because the UE 301 is in an RRC_Connected state 330. The UE 301 may transmit a RRC connection reconfiguration complete 316 to the target RAN node 304. The target RAN node may notify the AMF 305 of the handover 317. The target RAN node 304 may transmit a RRC connection release 318 with RRC_Inactive information such that the UE 301 may transition to a RRC_Inactive state 331. The target RAN node 304 may transmit RAN paging 319 to RAN node in a RAN paging area 306. The RAN paging 319 may be used to trigger the RAN node in the RAN paging area 306 to page the UE 301. The target RAN node 304 may also page the UE 301 using RAN paging 320. The paging resource for the RAN paging may be selected based on the UE capability for paging. The RAN node in the RAN paging area 306 may also transmit RAN paging 321 the UE 301 based on the UE's capability for paging. That is, the UE's paging capability may be used by the target RAN node 304 and the RAN node in the RAN paging area 306 to select paging resource for the UE. The paging resources may include at least one of paging narrowband, POs, paging wakeup signal resource, paging GWUS, paging frequency band, paging BWP, and the like.

Handing over the UE from the prior BS to the new BS may involve control signals over the Xn interface. An Xn Application Protocol (XnAP) interface provides control plane signaling over the Xn interface. During the handover process based on the Xn interface, the UE capability for paging may be carried in the Xn interface handover signaling and/or the NGAP path switch request confirmation signaling.

Figure 4:
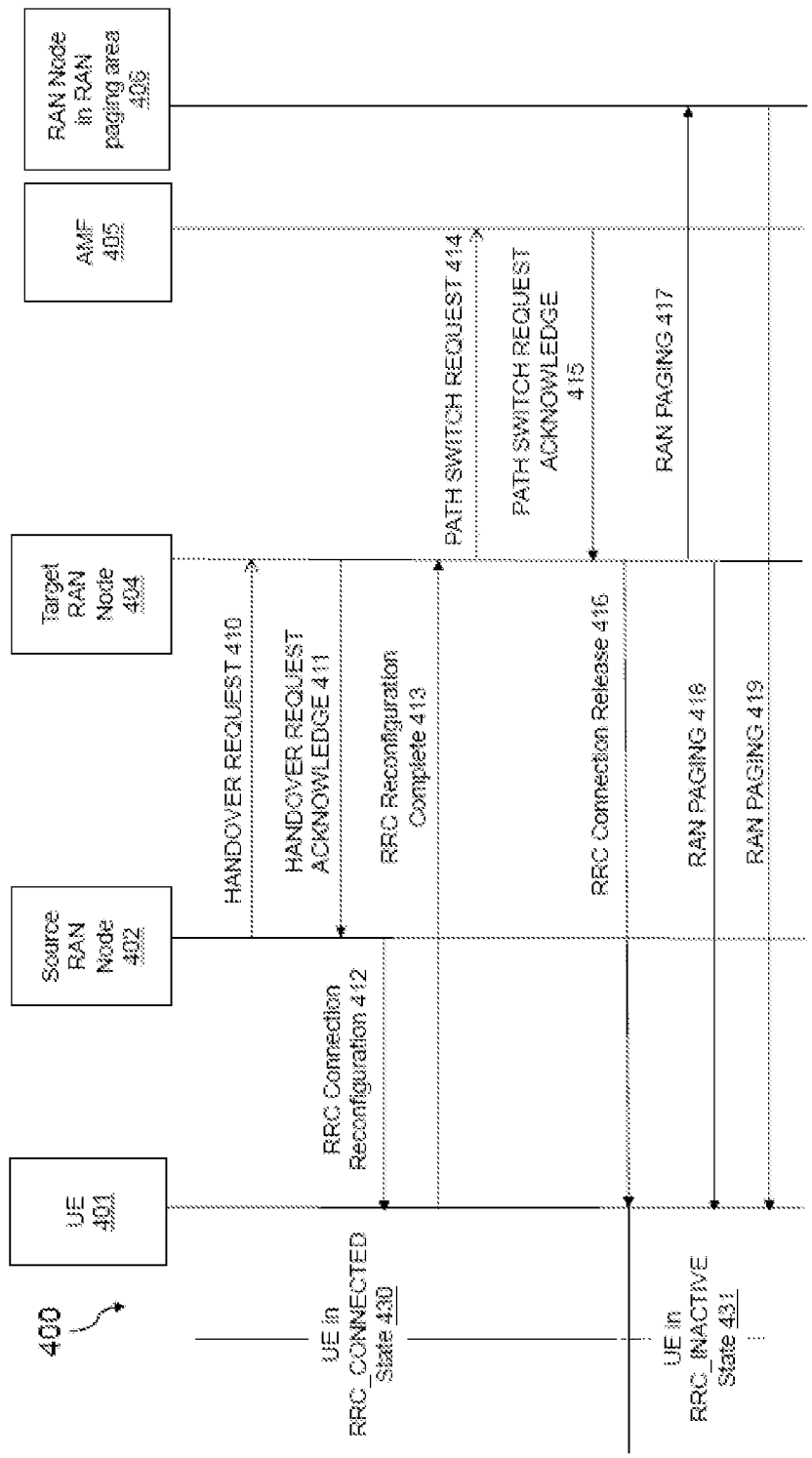
FIG. 4 illustrates a timing diagram of handover signaling with an Xn interface, in accordance with some implementations of the present disclosure.

FIG. 4 illustrates a timing diagram 400 of handover signaling with an Xn interface, in accordance with some implementations of the present disclosure. As shown, the source RAN node 402 may determine to handover UE 401 by transmitting a handover request 410 to a target RAN node 404. The handover request 410 may include the UE 401 paging capabilities. The target RAN node 404 may acknowledge the request by transmitting a handover request acknowledge 411 to the source RAN node 402. The source RAN node 402 may prepare the UE 401 for handover by transmitting a RRC connection reconfiguration 412 signal. The UE 401 may receive the RRC connection reconfiguration 412 because the UE 401 is in a RRC_Connected state 430. The UE 401 may transmit a RRC connection reconfiguration complete 413 to the target RAN node 404. The target RAN node transmit a path switch request 414 to AMF 405. The AMF 405 may acknowledge the path switch request via a path switch request acknowledge 415. The path switch request acknowledge 415 may include the UE 401 paging capabilities. The target RAN node 404 may transmit a RRC connection release 416 with RRC_Inactive information such that the UE 401 may transition to a RRC_Inactive state 431. The target RAN node 404 may transmit RAN paging 417 to RAN node in a RAN paging area 406. The RAN paging 417 may be used to trigger the RAN node in the RAN paging area 406 to page the UE 401. The target RAN node 404 may also transmit RAN paging 418 to the UE 401. The paging resource for the RAN paging may be selected based on the UE capability for paging. The RAN node in the RAN paging area 406 may also transmit RAN paging 419 the UE 401 based on the UE's capability for paging. That is, the UE's paging capability may be used by the target RAN node 404 and the RAN node in the RAN paging area 406 to select paging resource for the UE. The paging resources may include at least one of paging narrowband, POs, paging wakeup signal resource, paging GWUS, paging frequency band, and paging BWP.

During the RRC connection re-establishment process based on the Xn interface, the UE's paging capability may be carried in the Xn interface to obtain UE context response signaling and/or NGAP path switching request confirmation signaling.

Figure 5:
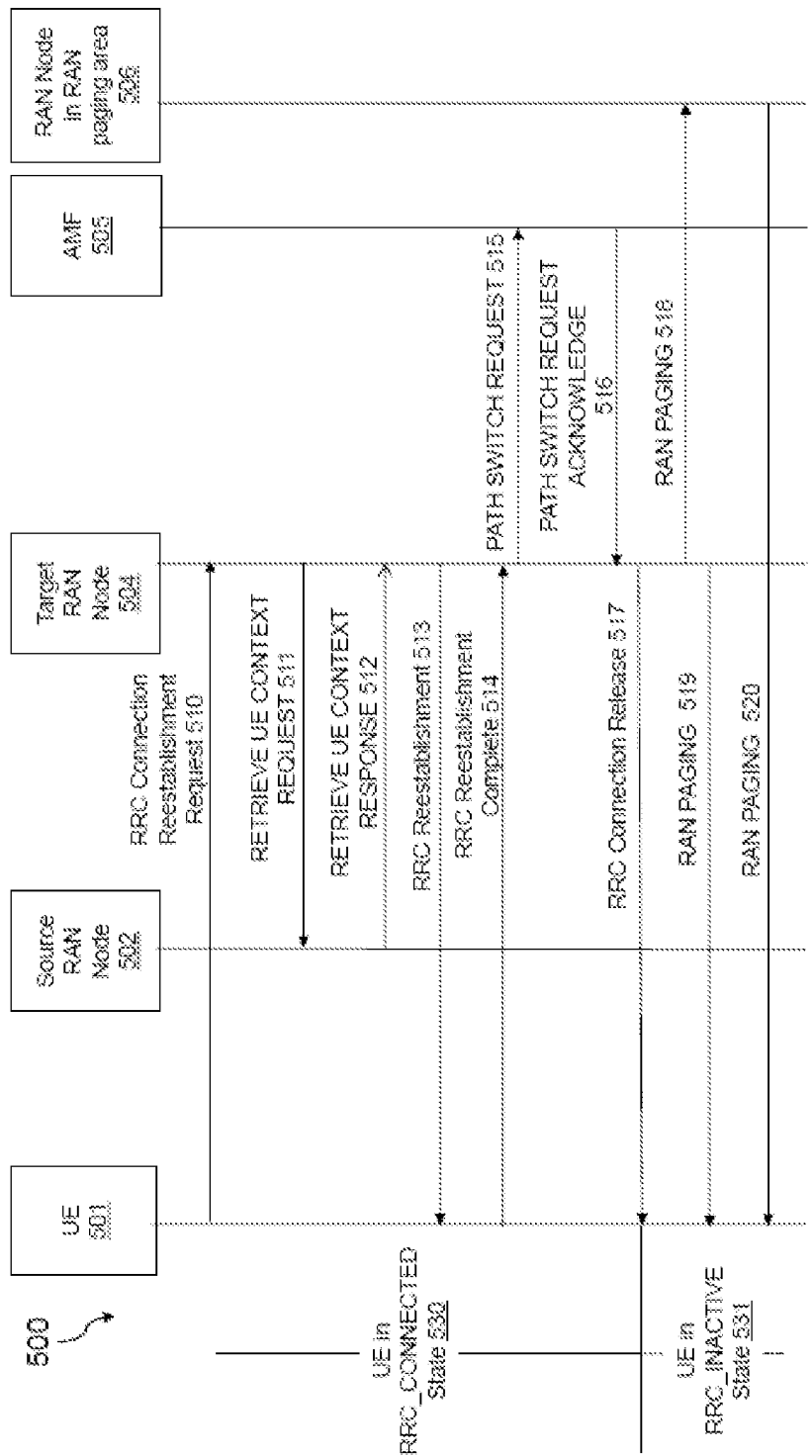
FIG. 5 illustrates a timing diagram of RRC connection reestablishment with an Xn interface, in accordance with some implementations of the present disclosure.
Figure 6:
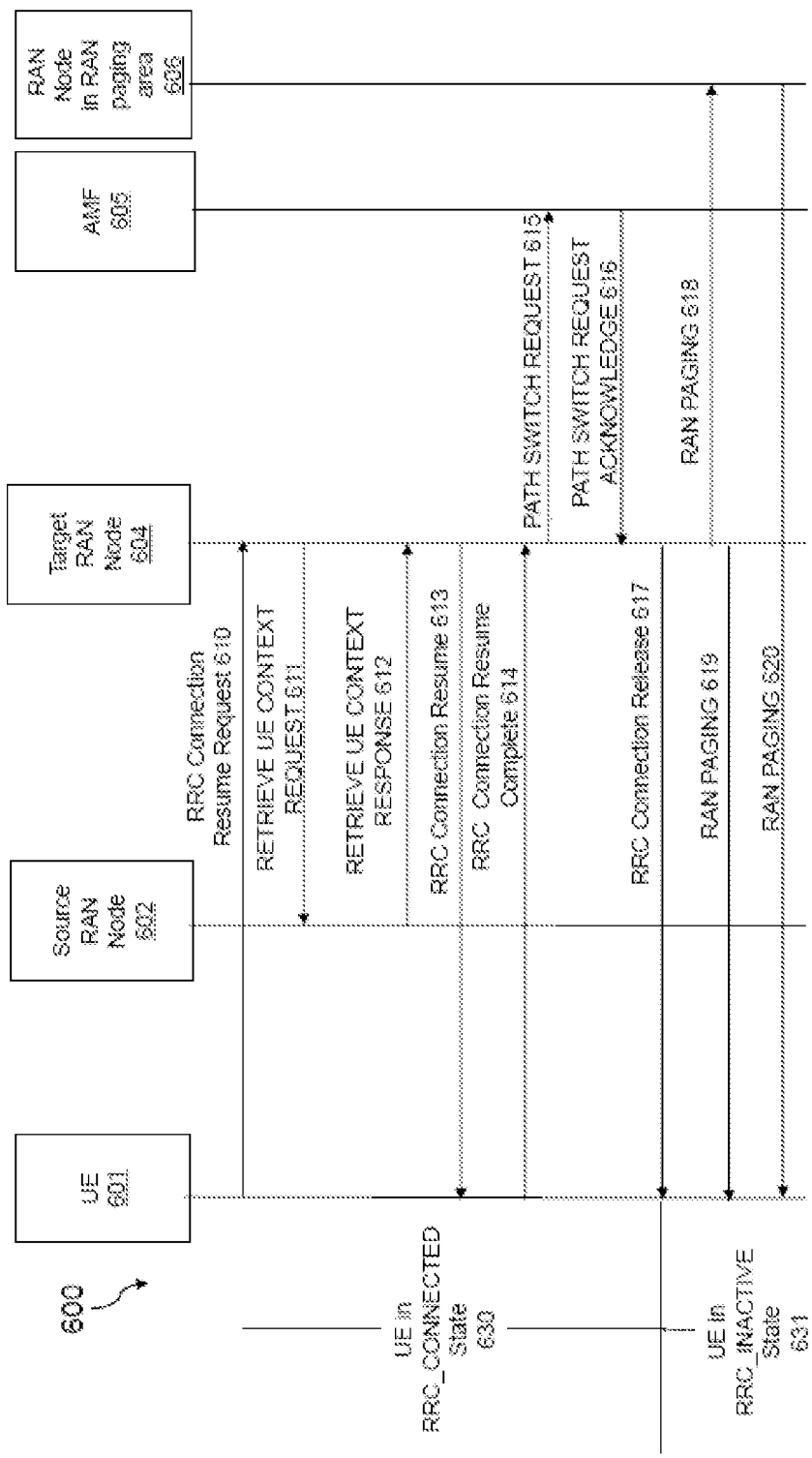
FIG. 6 illustrates a timing diagram of resuming RRC connections with an Xn interface.

FIG. 5 illustrates a timing diagram 500 of RRC connection reestablishment with an Xn interface, in accordance with some implementations of the present disclosure. As shown, UE 501 may transmit a RRC connection reestablishment request 510 to a target RAN node 504. The target RAN node 504 may transmit to the source RAN node 502 a request to retrieve UE context 511. The source RAN node 502 may transmit to the target RAN node 504 a response to the retrieve UE context 512. The response may include the UE 501 paging capabilities. The target RAN node 404 may transmit to the UE 501 a RRC connection reestablishment 513. The UE 501 may transmit back to the target RAN node 504 a RRC connection reestablishment complete 514. The target RAN node may transmit a path switch request 515 to the AMF 505. The AMF 505 may acknowledge the path switch request using an acknowledge 516. The acknowledge 516 may include the UE paging capabilities. The target RAN node 504 may transmit to the UE 501 an RRC connection release 517 with RRC_Inactive state information such that the UE 501 may transition from being in an RRC_Conected state 530 to an RRC_Inactive state 531. The target RAN node 504 may transmit RAN paging 518 to RAN node in a RAN paging area 506. The RAN paging 518 may be used to trigger the RAN node in the RAN paging area 506 to page the UE 501. The RAN paging may include the UE 501 capability for paging. The target RAN node 504 may also transmit RAN paging 519 the UE 501 while the UE 501 is in a RRC_Inactive state 531. The resources for the page 519 may be selected based on the UE's capability for paging. The RAN node in the RAN paging area 506 may subsequently transmit RAN paging 520 UE 501. The resources for the RAN paging 520 may be selected based on the UE's capability for paging. That is, the UE's paging capability may be used by the target RAN node 504 and the RAN node in the RAN paging area 506 to select paging resource for the UE. The paging resources may include at least one of paging narrowband, POs, paging wakeup signal resource, paging GWUS, paging frequency band, and paging BWP FIG. 6 illustrates a timing diagram 600 of resuming RRC connections with an Xn interface. As shown, UE 601 may transmit a RRC connection resume request 610 to a target RAN node 604. The target RAN node 604 may request 611 to retrieve UE context from the source RAN node 602. The source RAN node 602 may respond 612 to the target RAN node 604 retrieve UE context request. The response 612 may include the UE 601 paging capabilities. The target RAN node 604 may transmit a RRC connection resume 613 signal to the UE 601. The UE 601 may transmit back to the target RAN node 604 a RRC connection resume complete 614 signal. The target RAN node 604 may transmit a path switch request 615 to the AMF 605. The AMF 605 may transmit an acknowledge 616 of the path switch request to the target RAN node 604. The acknowledge 616 may include the UE 601 paging capabilities. The target RAN node 604 may transmit a RRC connection release 617 to the UE 601. The RRC connection release 617 may include RRC_Inactive related information such that the UE 601 may transition from being in RRC_Connected state 630 to RRC_Inactive state 631. The target RAN node 604 may transmit RAN paging 618 to a RAN node in a RAN paging area 606. The RAN paging 618 may be used to trigger the RAN node in the RAN paging area 606 to page the UE 601. The RAN paging may include the UE 601 capability for paging. The target RAN node 604 may also transmit RAN paging 619 the UE 601 while the UE 601 is in an RRC_Inactive state 631. The resources for the RAN paging 619 may be selected based on the UE's capability for paging. The RAN node in the RAN paging area 606 may subsequently transmit RAN paging 620 to UE 601. The resources for the RAN paging 620 may be selected based on the UE's capability for paging. That is, the UE's paging capability may be used by the target RAN node 604 and the RAN node in the RAN paging area 606 to select paging resource for the UE. The paging resources may include at least one of paging narrowband, POs, paging wakeup signal resource, paging GWUS, paging frequency band, and paging BWP.

B. Paging Carrier Selection Strategy

A BS, such as an evolved node B (eNB) and gNB, may select a paging carrier based on the UE's paging capability, as discussed above. A UE may also select paging carriers. The carriers may include a paging narrow band (e.g., in eMTC), a paging bandwidth part (BWP), or a paging frequency in NR based on the paging band configuration. In an example, a cell may be configured with multiple paging BWPs. The multiple BWPs may be configured with different default paging DRX parameters. The DRX parameters may be used to determine the paging occasion.

Figure 7:
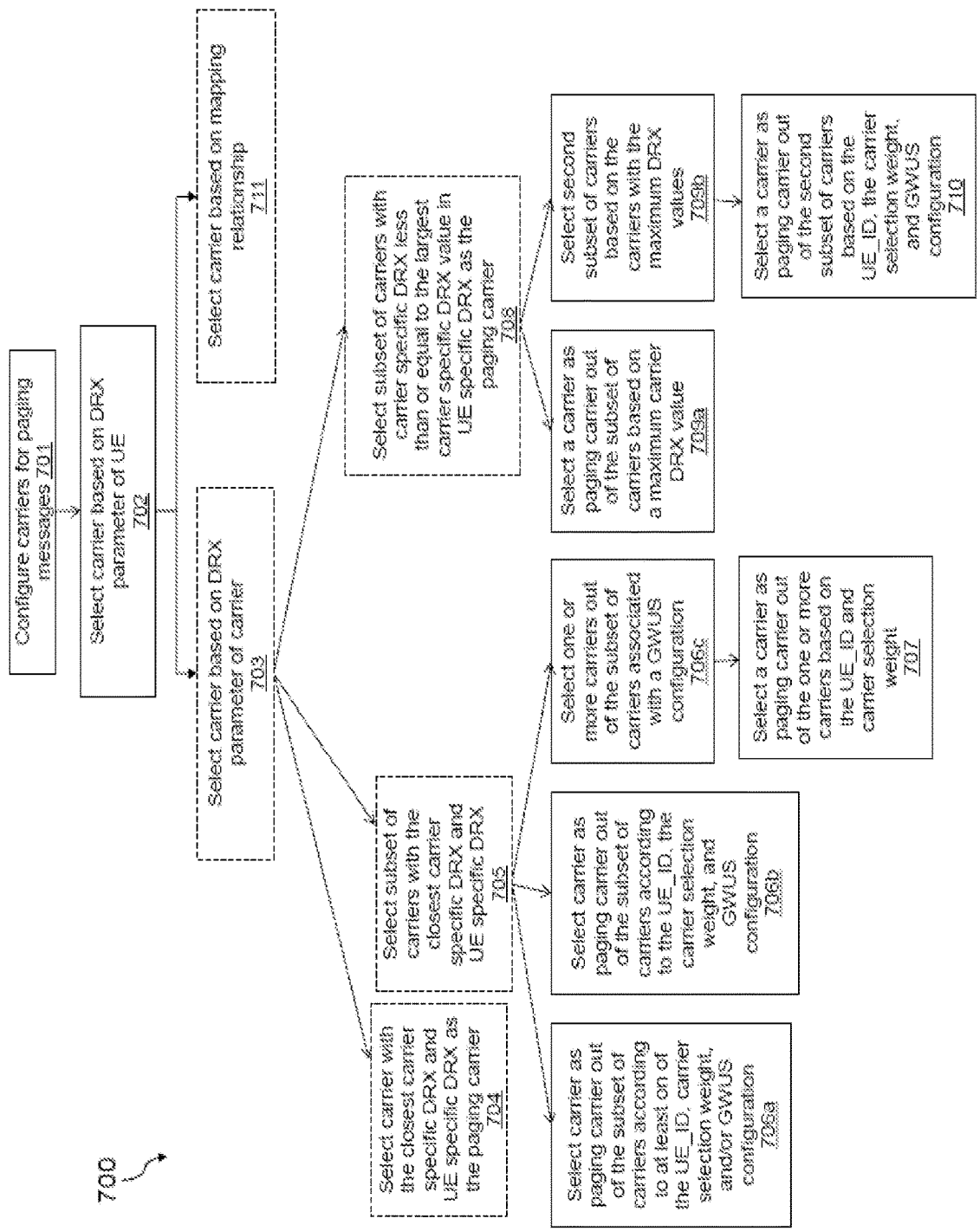
FIG. 7 illustrates an example method of selecting a carrier to transmit paging information, in accordance with some implementations of the present disclosure.

FIG. 7 illustrates an example method 700 of selecting a carrier to transmit paging information, in accordance with some implementations of the present disclosure. As shown in step 701, the BS may configure multiple carriers in preparation for sending a paging message to a UE. In step 702, the BS may select a configured carrier for sending a paging message to the UE according to a carrier selection strategy. The BS may select the carrier based on the DRX parameter for the UE. In selecting the carrier for sending the paging messages, the BS may determine differences between DRX parameters specific for the UE. The UE may select the same carrier resource as the BS using the same carrier selection strategy.

A carrier selection strategy may be executed when: (1) the DRX parameter of the UE is known (2) the UE supports DRX cycle based carrier selection and (3) the DRX parameters of carriers have been configured according to system information blocks (SIB). A paging carrier (or a set/subset of paging carriers) may be configured for a UE in the SIB from the BS (e.g., eNB, gNB). The paging carrier may be configured according to: (1) a paging carrier list for the UE (2) the UE's indication of a carrier or (3) a UE's instructions for the paging carrier parameter.

Accordingly, in optional step 703, the BS may select the carrier configured for sending the paging message to the UE based on the DRX parameters for each of the configured carriers. The UE may select the same carrier resource as the BS.

For example, as shown in optional step 704, the BS may select a configured carrier for sending a paging message to the UE based on (1) DRX parameters specific for the UE and (2) DRX parameters of the configured carriers. For instance, the BS may determine the difference between the DRX parameters for the specific UE and the DRX parameters for each of the configured carriers. The BS may select the configured carrier based on the minimum difference between the DRX parameters for the specific UE and the DRX parameters for the configured carriers. The UE may select the same carrier resource as the BS.

For example, the DRX parameter value for the carriers or for the specific UE may be a radio frame (rf) with the following lengths: rf32 (rf for a duration of 320 ms), rf64 (rf for a duration of 640 ms), rf128 (rf for a duration of 1280 ms), rf256 (rf for a duration of 2560 ms), rf512 (rf for a duration of 5120 ms), rf1024 (rf for a duration of 10240 ms).

In a first instance, when the value of a narrowband (NB) Internet of things (IoT) UE DRX parameter is rf32, the UE may select the carrier with the carrier specific DRX parameter of rf32. When the carrier with the carrier specific DRX parameter of rf32 is not configured, the carrier with the carrier specific DRX parameter of rf64 may be selected. When the carrier with the carrier specific DRX parameter of rf64 is not configured, the carrier with the carrier specific DRX parameter of rf128 may be selected. When the carrier with the carrier specific DRX parameter of rf128 is not configured, the carrier with the carrier specific DRX parameter of rf256 may be selected. When the carrier with the carrier specific DRX parameter of rf256 is not configured, the carrier with the carrier specific DRX parameter of rf512 may be selected. When the carrier with the carrier specific DRX parameter of rf512 is not configured, the carrier with the carrier specific DRX parameter of rf1024 may be selected.

In a second instance, when the value of the NB IoT UE DRX parameter is rf128, the UE may select the carrier with the carrier specific DRX parameter of rf128. When the carrier with the carrier specific DRX parameter of rf128 is not configured, the carrier with the carrier specific DRX parameter of rf64 may be selected. When the carrier with the carrier specific DRX parameter of rf64 is not configured, the carrier with the carrier specific DRX parameter of rf32 may be selected. When the carrier with the carrier specific DRX parameter of rf32 is not configured, the carrier with the carrier specific DRX parameter of rf256 may be selected. When the carrier with the carrier specific DRX parameter of rf256 is not configured, the carrier with the carrier specific DRX parameter of rf512 may be selected. When the carrier with the carrier specific DRX parameter of rf512 is not configured, the carrier with the carrier specific DRX parameter of rf1024 may be selected.

In a third instance, when the value of the NB IoT UE DRX parameter is rf256, the UE may select the carrier with the carrier specific DRX parameter of rf256. When the carrier with the carrier specific DRX parameter of rf256 is not configured, the carrier with the carrier specific DRX parameter of rf128 may be selected. When the carrier with the carrier specific DRX parameter of rf128 is not configured, the carrier with the carrier specific DRX parameter of rf64 may be selected. When the carrier with the carrier specific DRX parameter of rf64 is not configured, the carrier with the carrier specific DRX parameter of rf32 may be selected. When the carrier with the carrier specific DRX parameter of rf32 is not configured, the carrier with the carrier specific DRX parameter of rf512 may be selected. When the carrier with the carrier specific DRX parameter of rf512 is not configured, the carrier with the carrier specific DRX parameter of rf1024 may be selected.

Additionally or alternatively, as shown in optional step 705, a carrier may be selected from a subset of carriers configured for sending paging messages to the UE. The subset of carriers may be the carriers closest to the DRX parameter for the specific UE. The BS may select the subset of carriers (e.g., the closest carriers to the DRX parameter for the specific UE) for sending paging messages to the UE based on the absolute value of the minimum difference between the DRX parameters for the specific UE and the DRX parameters for each of the configured carriers. For instance, the BS may determine the difference between the DRX parameters for the specific UE and the DRX parameters for each of the configured carriers to create a subset of the closest carriers.

The BS may select a carrier from the subset of carriers. In one embodiment, as shown in step 706a, the BS may select the carrier for sending paging messages from the subset of carriers based on at least one of (1) User Equipment Identification (UE_ID) (2) weights of each of the subsets of carriers and (3) the GWUS configurations of the subsets of carriers. The UE may select the same carrier resource as the BS. In alternate embodiment, as shown in step 706b, the BS may select the carrier for sending paging messages from the subset of carriers based on the UE_ID and the weights of the subset of carriers. Further, the BS may determine whether the selected carrier is associated with a GWUS configuration and whether to use the GWUS configuration.

Additionally or alternatively, step 706c may be performed before step 705. For example, the BS may select a first subset of carriers with GWUS configurations, and then select a second subset of carriers based on the DRX parameters of the carriers from the first subset of carriers, and then select the paging carrier based on the UE_ID. The UE may select the same carrier resource as the BS.

Additionally or alternatively, as shown in step 706c, the BS may select one or more carriers in response to determining that the one or more carriers are associated with GWUS configurations. In step 707, the BS selects, from the one or more carriers, a carrier for sending paging messages based on the UE_ID and the weights of the carriers. The UE may select the same carrier resource as the BS.

A UE may monitor GWUS in a cell in the event that the UE monitors the cell based on GWUS monitoring conditions such as (1) the UE is capable of GWUS monitoring (2) the GWUS parameters are configured and (3) the UE is normally released in the cell. In the event the UE monitors GWUS in the cell, the UE (or BS) may select, from the carriers configured with GWUS configurations from the carrier set, a carrier based on UE_ID and/or the weights of carriers.

In an example, a specific UE DRX parameter may be rf64 and the UE may monitor GWUS in a cell. The carriers may have the characteristics as described in Table 1 below.

TABLE 1

Carrier Configurations in an Example

|  | DRX cycle per carrier | GWUS configuration |
|---|---|---|
| Carrier 1 | rf32 | Not configured |
| Carrier 2 | rf64 | Configured |
| Carrier 3 | rf64 | Not configured |
| Carrier 4 | rf64 | Configured |
| Carrier 5 | rf128 | Configured |
| Carrier 6 | rf1024 | Not configured |

Given the example, carriers 2, 3, and 4 may be selected based on carriers 2-4 having equally close DRX parameters (e.g., rf64). In some circumstances, if carrier 3 is selected, the UE may not monitor GWUS in the cell. Alternatively, if carrier 2 or carrier 4 are selected, the UE may monitor GWUS in the cell. In other circumstances, a carrier may be selected based on a UE_ID and/or a carrier weight.

Additionally or alternatively, carriers 2, 4 and 5 may be selected based on the UE's capability to monitor GWUS. From the subset of carriers 2, 4, and 5, carriers 2 and 4 may be selected for having equally close DRX parameters (e.g., rf64). A paging carrier may be selected based on UE_ID and/or carrier weight.

As shown in optional step 708, the BS may select a subset of carriers based on determining that the DRX parameters of the subset of carriers are less than or equal to the DRX parameters of the UE. As shown in step 709a, the BS may select a carrier for sending a paging message from the subset of carriers based on determining the carrier with the maximum value of the DRX parameter in the subset of carriers. The UE may select the same carrier resource as the BS. In an alternate embodiment, as shown in 709b, the BS may select a second subset of carriers from the subset of carriers. The second set of carriers may be based on determining the one or more carriers with the maximum values of the DRX parameter in the subset of carriers. As shown in 710, the BS may select a carrier for sending a paging message from the second subset of carriers based on at least one of UE_ID, respective weights of the subset of carriers, or respective GWUS configurations of the second subset of carriers. The UE may select the same carrier resource as the BS.

If the UE can not monitor the GWUS in the cell (e.g., the UE has not satisfied the GWUS monitoring conditions), a carrier may be selected from the second subset of carriers based on UE_ID and/or weights of the subset of carriers.

Additionally or alternatively, in the event the UE monitors GWUS in the cell, the UE may select, from the carriers configured with GWUS configurations, a carrier based on UE_ID and/or the weight of the carriers.

In an example, a specific UE DRX parameter may be rf64 and the UE may monitor GWUS in a cell. The carriers may have the characteristics as described in Table 2 below.

TABLE 2

Carrier Configurations in an Example

|  | DRX cycle per carrier | GWUS configuration |
|---|---|---|
| Carrier 1 | rf32 | Not configured |
| Carrier 2 | rf64 | Configured |
| Carrier 3 | rf64 | Not configured |
| Carrier 4 | rf64 | Configured |
| Carrier 5 | rf128 | Configured |
| Carrier 6 | rf1024 | Not configured |

Given the example, the UE may select carriers from carriers 1, 2, 3, and 4 based on carriers 1-4 having DRX parameters less than or equal to the UE DRX parameter (e.g., rf64). The UE may further select carriers 2-4 based on carriers 2-4 having the maximal DRX carrier parameters of the carriers selected from carriers 1-4. The UE may further select carriers based on the GWUS configuration. For example, the UE may select carrier 2 or 4 because the UE can monitor GWUS in the cell. From the subset of carriers 2, and 4 the UE may select a carrier based on a UE_ID and/or a carrier weight. In the event that carrier 3 is selected, the UE can not monitor GWUS in the cell.

Additionally or alternatively, the UE may select carriers 2 and 4 based on the UE's capability to monitor GWUS in carriers 2 and 4. The UE may further select a carrier based on UE_ID and/or carrier weight.

As shown in optional step 711, the paging carrier may be selected based on a mapping relationship. A mapping relationship may be configured between the DRX parameter of the UE and the paging carrier. The mapping relationship may be indicated in the System Information (SI). The mapping relationship may be based on: (1) configuring a DRX parameter interval (or segment) threshold of the UE and a DRX parameter interval index of the UE corresponding to each carrier (2) configuring the DRX parameter interval (or segment) threshold of the UE and a carrier range corresponding to each DRX parameter interval of the UE or (3) configuring each carrier with the DRX parameter range of the UE that may be carrier (e.g., minUESpecificDRX, maxUESpecificDRX). The paging carrier may be selected based on the DRX parameter of the UE and the mapping relationship. In the event there are multiple selected carriers, the paging carrier may be selected based on the UE_ID and/or the GWUS resource group.

When the paging carrier selection strategy based on a maximum number of repetitions for Physical Downlink Control Channel (PDCCH) in a common search space (CSS) for paging (Rmax-paging parameter) and the DRX parameter of the UE are both options (e.g., the network is configured with related parameters and the UE supports related functions), the paging carrier may be selected based on Rmax-paging to define a subset of paging carriers. Subsequently, the paging carrier may be selected based on the DRX parameter of the UE. The Rmax-paging parameter may be the same as the Coverage Enhancement Level (CEL) and the Enhanced Coverage Level (ECL).

For UEs with limited coverage enhancements (e.g., small CEL and Rmax-paging parameter), the carrier with the smallest Rmax-paging parameter may be selected. That is, the UE type may be selected and determined, and then the carrier based on the Rmax-paging parameter and/or DRX parameter of the UE is determined based on the UE type.

In some embodiments, carriers may be configured for each Rmax-paging parameter or the Rmax-paging parameter of the UE may be configured. In these circumstances, the paging carrier may be selected according to the Rmax-paging parameter of the configured carrier being the same as the Rmax-paging parameter of the UE.

In the event that: (1) the DRX parameter of the UE is provided, (2) both the DRX parameter of the carrier and Rmax-paging parameter of the carrier are configured (3) the UE supports selecting paging carriers according to Rmax-paging parameters and (4) the UE supports selecting paging carriers according to DRX parameters of carriers, then the UE may perform a carrier selection strategy.

Figure 8:
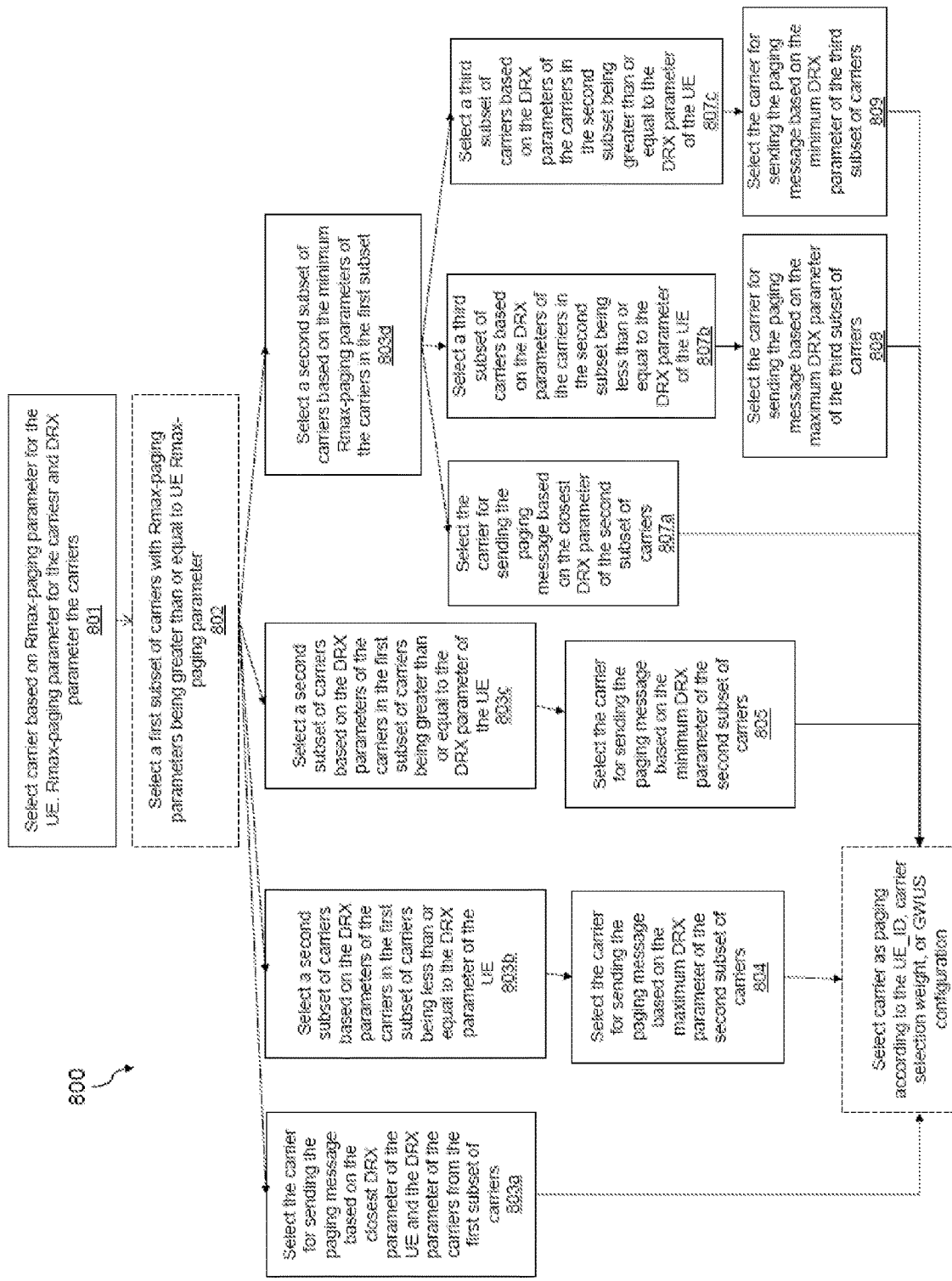
FIG. 8 illustrates an example method of selecting a carrier to transmit paging information, in accordance with some implementations of the present disclosure.

FIG. 8 illustrates an example method 800 of selecting a carrier to transmit paging information, in accordance with some implementations of the present disclosure. As shown in step 801, the BS may select the carrier for sending paging messages based on (1) Rmax-paging parameter of the UE (2) DRX parameters for each of the carriers and (3) Rmax-paging parameters for each of the carriers. The UE may select the same carrier resource as the BS.

In optional step 802, the BS may select a first subset of carriers based on determining that the Rmax-paging parameters of each of the carriers in the first subset of carriers are greater than or equal to the Rmax-paging parameter of the UE. In step 803a, the BS may select a carrier for sending the paging message based on the closest DRX parameter of the UE and the DRX parameter of the carriers from the first subset of carriers. The closest DRX parameter may be determined by finding the minimum absolute value of the difference of the DRX parameters of the UE and the DRX parameters in the first subset of carriers. The UE may select the same carrier resource as the BS.

Additionally or alternatively, as shown in step 803b, the BS may select a second subset of carriers based on the DRX parameters of the carriers in the first subset of carriers being less than or equal the DRX parameter of the UE. As shown in step 804, the BS may select a carrier for sending the paging message based on the maximum DRX parameters of the carriers from the second subset of carriers. The UE may select the same carrier resource as the BS.

Additionally or alternatively, as shown in step 803c, the BS may select a second subset of carriers based on the DRX parameters of the carriers in the first subset of carriers being greater than or equal to the DRX parameter of the UE. As shown in step 805, the BS may select a carrier for sending the paging message based on the minimum DRX parameters of the carriers from the second subset of carriers. The UE may select the same carrier resource as the BS.

Additionally or alternatively, as shown in step 803d, the BS may select a second subset of carriers based on the minimum Rmax-paging parameters of the carriers in the first subset of carriers. As shown in step 807a, the BS may select the carrier for sending the paging message based on the closest DRX parameter of the second subset of carriers. The BS may determine the closest DRX parameter by determining the minimum absolute values of the difference of each of the DRX parameters of the carriers in the second subset and the DRX parameter of the UE. The UE may select the same carrier resource as the BS.

Additionally or alternatively, as shown in step 807b, the BS may select a third subset of carriers based on the DRX parameters of the carriers in the second subset being less than or equal to the DRX parameter of the UE. As shown in step 808, the BS may select the carrier for sending the paging message based on the maximum DRX parameter value of the third subset of carriers. The UE may select the same carrier resource as the BS.

Additionally or alternatively, as shown in step 807c, the BS may select the third subset of carriers based on the DRX parameters of the carriers in the second subset being greater than or equal to the DRX parameters of the UE. As shown in step 809, the BS may select the carrier for sending the paging message based on the minimum DRX parameter value of the third subset of carriers. The UE may select the same carrier resource as the BS.

Additionally or alternatively, as shown in optional step 806, in the event that the UE can monitor GWUS in the cell (based on GWUS monitoring conditions such as (1) the UE is capable of monitoring GWUS (2) the GWUS parameters are configured and (3) the UE is normally released in the cell), the carrier may be selected for paging from the subsets based on at least one of the UE_ID, weights of each of the carriers, or GWUS configurations of the carriers.

In an example, the UE may have the following conditions: Rmax-paging parameter=4, CEL-CEL1, DRX parameter of UE is rf64, and the UE can monitor the GWUS in the cell (e.g., the UE satisfies the monitoring conditions). The carriers may have the characteristics as described in Table 3 below.

TABLE 3

Carrier Configurations in an Example

| | CEL (Rmax-paging) | DRX cycle per carrier | GWUS configuration |
|---|---|---|---|
| Carrier 1 | CEL0 (1) | rf32 | Not configured |
| Carrier 2 | CEL0 (1) | rf64 | Configured |
| Carrier 3 | CEL1 (4) | rf64 | Not configured |
| Carrier 4 | CEL1 (4) | rf64 | Configured |
| Carrier 5 | CEL2 (16) | rf128 | Configured |
| Carrier 6 | CEL2 (16) | rf1024 | Not configured |

The carrier for sending the paging message may be selected with the Rmax-paging parameter (or CEL value) that is greater than or equal to the Rmax-paging parameter (CEL) of the UE (e.g., a subset of carriers 3-6). In a next step of the carrier selection process, the carriers with the closer Rmax-paging parameter (or CEL value) may be selected from the subset of carriers 3-6. That is, carriers 3 and 4 may be selected (because of CEL1). In the event that carrier 4 is selected, because carrier 4 is configured for GWUS, the UE may monitor GWUS in the cell. In the event that carrier 3 is selected, because carrier 3 is not configured, GWUS may not be monitored in the cell.

Additionally or alternatively, the carriers for sending the paging message may be selected with the Rmax-paging parameter (or CEL value) that is greater than or equal to the Rmax-paging parameter (CEL) of the UE (e.g., a subset of carriers 3-6). In a next step of the carrier selection process, carriers may be selected from the subset of carriers 3-6 based on the DRX parameter of the UE. For instance, the carrier with the DRX parameter that is closest to the DRX parameter of the UE may be selected. The carrier with the DRX parameter that is closest to the DRX parameter of the UE may be determined by taking the minimum absolute value of the difference of the DRX parameters of each of the carriers and the DRX parameter of the UE. Accordingly, carriers 3-4 may be selected.

Additionally or alternatively, a subset of carriers may be selected from the subset of carriers 3-6 with the DRX parameters that are less than or equal to the DRX parameter of the UE. Accordingly, carriers 3-4 may be selected. Subsequently, the carriers with the maximum DRX parameters of the subset of carriers 3-4 may be selected.

Additionally or alternatively, a subset of carriers may be selected from the subset of carriers 3-6 with the DRX parameters that are greater than or equal to the DRX parameter of the UE. Accordingly, carriers 4-6 may be selected. Subsequently, the carrier with the minimum DRX parameters of the subset of carriers 3-4 may be selected.

In the event that the UE can monitor the GWUS in the cell (e.g., the GWUS monitoring conditions are satisfied), the carrier may be selected that is configured with GWUS. Accordingly, carrier 4 may be selected. Carriers may further be selected based on UE_ID and paging carrier weight. In the event that one carrier is selected, that carrier may be the paging carrier.

Additionally or alternatively, the BS may select a first subset of carriers with GWUS configurations, and subsequently select a second subset of carriers based on the DRX parameters of the carriers and/or based on the Rmax-paging parameters of the carriers from the first subset of carriers. In a next step of the carrier selection process, the paging carrier may be selected based on the UE_ID. The UE may select the same carrier resource as the BS.

Additionally or alternatively, in the event that the BS determines that the UE is in the last connected cell (e.g. has not moved to a new cell), a carrier for a paging message (based on the DRX parameter of the UE, the Rmax-paging parameter of the UE, and the Rmax-paging parameter of the carriers) may be determined.

Figure 9:
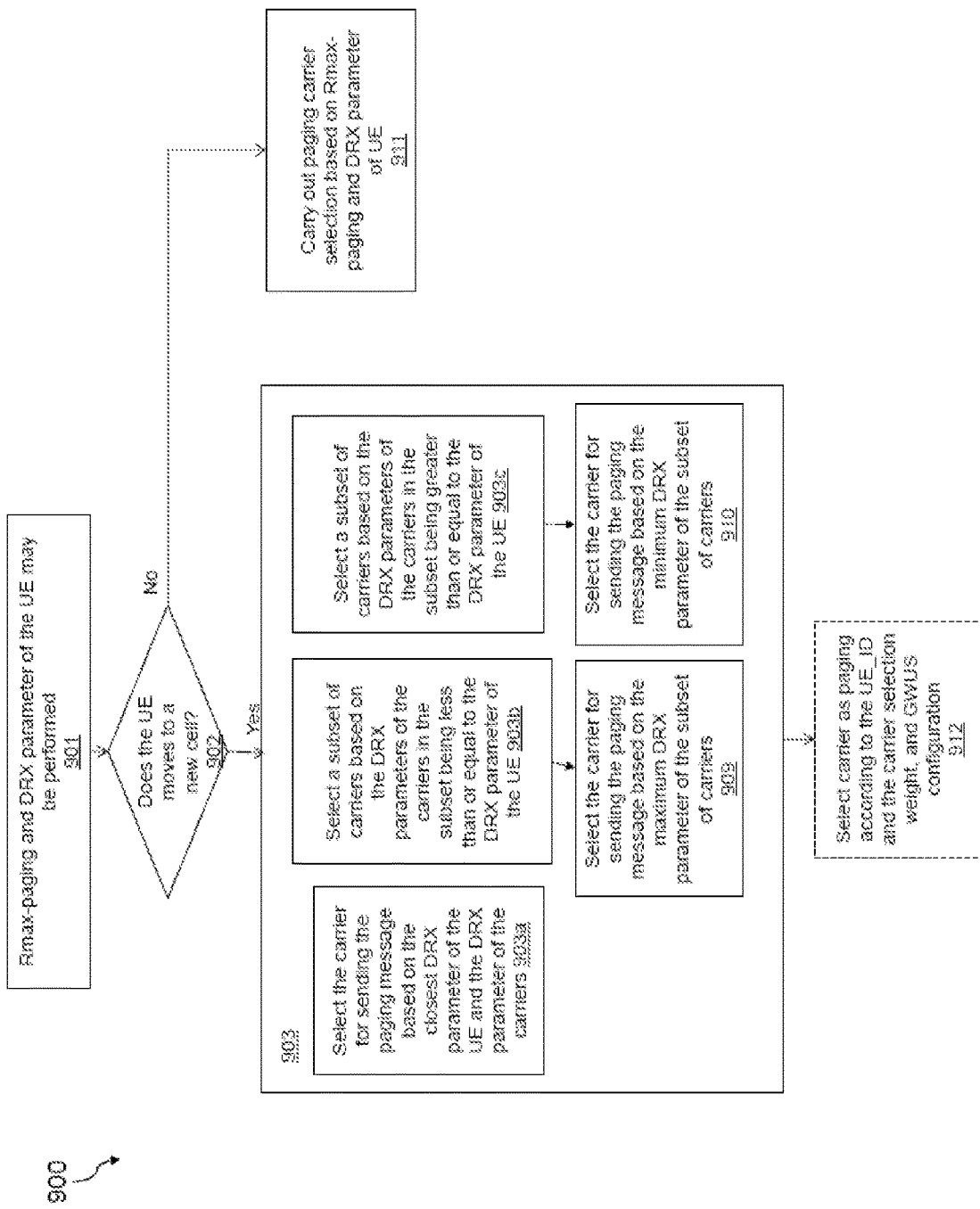
FIG. 9 illustrates an example method of selecting a carrier selection strategy using the DRX parameters of the carrier, in accordance with some implementations of the present disclosure.

FIG. 9 illustrates an example method 900 of selecting a carrier selection strategy using the DRX parameters of the carrier, in accordance with some implementations of the present disclosure. As shown in step 901, the paging carrier selection strategy based on Rmax-paging and DRX parameter of the UE may be activated (e.g., the network may be configured with the related parameters and the UE supports both carrier selection strategies such that selection strategies based on Rmax-paging parameters of the UE or DRX parameters of the UE may be performed). In some embodiments, the carrier selection strategy based on the Rmax-paging may be deactivated.

As shown in step 902, in the event the UE does not move to a new cell (e.g., the UE is in the same cell) or the paging cell is a not new cell (e.g., the paging cell is the same cell) then, as shown in step 911, the paging carrier may be selected based on the DRX parameter of the UE and the Rmax-paging parameter of the UE. In some circumstances, in the event the UE is not mobile (e.g., won't leave the BS cell), the UE may select a paging carrier outside of the paging set.

In the event the UE is mobile and the BS is configured with the UE's paging carrier set, the UE may select a paging carrier in the paging carrier set. For example, in the event the UE moves to a new cell (e.g., the UE is not in the normally released cell) or the paging cell is a new cell (e.g., the paging cell is not the cell that the normally released cell) then the UE may select the paging carrier by selecting a carrier based on the legacy paging carrier selection strategy (e.g. DRX based carrier selection and Rmax-paging carrier selection are not used) or based on the DRX parameter for the UE according to a carrier selection method in step 903.

One carrier selection method 903a is based on selecting a carrier for sending the paging message based on the closest DRX parameter of the UE and the DRX parameter of the carriers. The closest DRX parameter may be determined by finding the minimum absolute value of the difference of the DRX parameters of the UE and the DRX parameters of each of the carriers.

One carrier selection method 903b is based on selecting a subset of carriers based on the DRX parameters of the carriers in the subset of carriers being less than or equal the DRX parameter of the UE. As shown in step 909, the BS may select a carrier for sending the paging message based on the maximum DRX parameters of the carriers from the subset of carriers. The UE may select the same carrier resource as the BS.

One carrier selection method 903c is based on selecting a subset of carriers based on the DRX parameters of the carriers in the subset of carriers being greater than or equal to the DRX parameter of the UE. As shown in step 910, the BS may select a carrier for sending the paging message based on the minimum DRX parameters of the carriers from the subset of carriers. The UE may select the same carrier resource as the BS.

As shown in optional step 912, a carrier may be selected for paging from the subsets based on at least one of the UE_ID and weights of each of the carriers, or GWUS configurations of the carriers (if the UE can monitor the GWUS in the cell based on satisfied GWUS monitoring conditions).

In an example, an Rmax-paging parameter may of a UE may be 4 (e.g., Rmax-paging=4), the CEL of the UE may be CEL1, the DRX parameter of the UE may be rf64, and the UE may monitor GWUS in the cell. In the example, the UE moves to a new cell. The carriers may have the characteristics as described in Table 4 below.

TABLE 4

Carrier Configurations in an Example

| | DRX cycle per carrier | GWUS configuration |
|---|---|---|
| Carrier 1 | rf32 | Not configured |
| Carrier 2 | rf64 | Configured |

TABLE 4-continued

Carrier Configurations in an Example

| | DRX cycle per carrier | GWUS configuration |
|---|---|---|
| Carrier 3 | rf64 | Not configured |
| Carrier 4 | rf64 | Configured |
| Carrier 5 | rf128 | Configured |
| Carrier 6 | rf1024 | Not configured |

Given the example, the carriers may be selected based on the carriers with the closest DRX parameter to the DRX parameter of the UE (e.g., a subset of carriers 2-4). In the event that carrier 2 or 4 is selected, the UE may monitor the GWUS in the cell. In the event that carrier 3 is selected the UE may not monitor the GWUS because the monitoring conditions may not be satisfied.

Additionally or alternatively, carriers may be selected that are configured with GWUS. That is, carriers 2, 4 and 5 may be selected. In some circumstances, in a next step of the carrier selection process, the carriers may be selected based on the carriers with the closest DRX parameters to the DRX parameters of the UE (e.g., carriers 2 and 4). In some circumstances, in the next step of the carrier selection process, the carriers may be selected based on the DRX parameter of the carriers being less than or equal to the DRX parameter of the UE. Subsequently, the carrier may be selected from the carriers in the subset (e.g., carriers 2 and 4) with the minimum DRX parameter. In some circumstances, in the next step of the carrier selection process, the carriers may be selected based on the DRX parameter of the carriers being greater than or equal to the DRX parameter of the UE (e.g., carriers 2, 4, 5). Subsequently, the carrier may be selected from the carriers in the subset (e.g., carriers 2, 4, 5) with the minimum DRX parameter (e.g., carriers 2 and 4).

In the event there remains a subset of carriers to select the carrier for sending the paging message, a carrier may be selected based on the UE_ID and/or the paging carrier weight.

Figure 10:
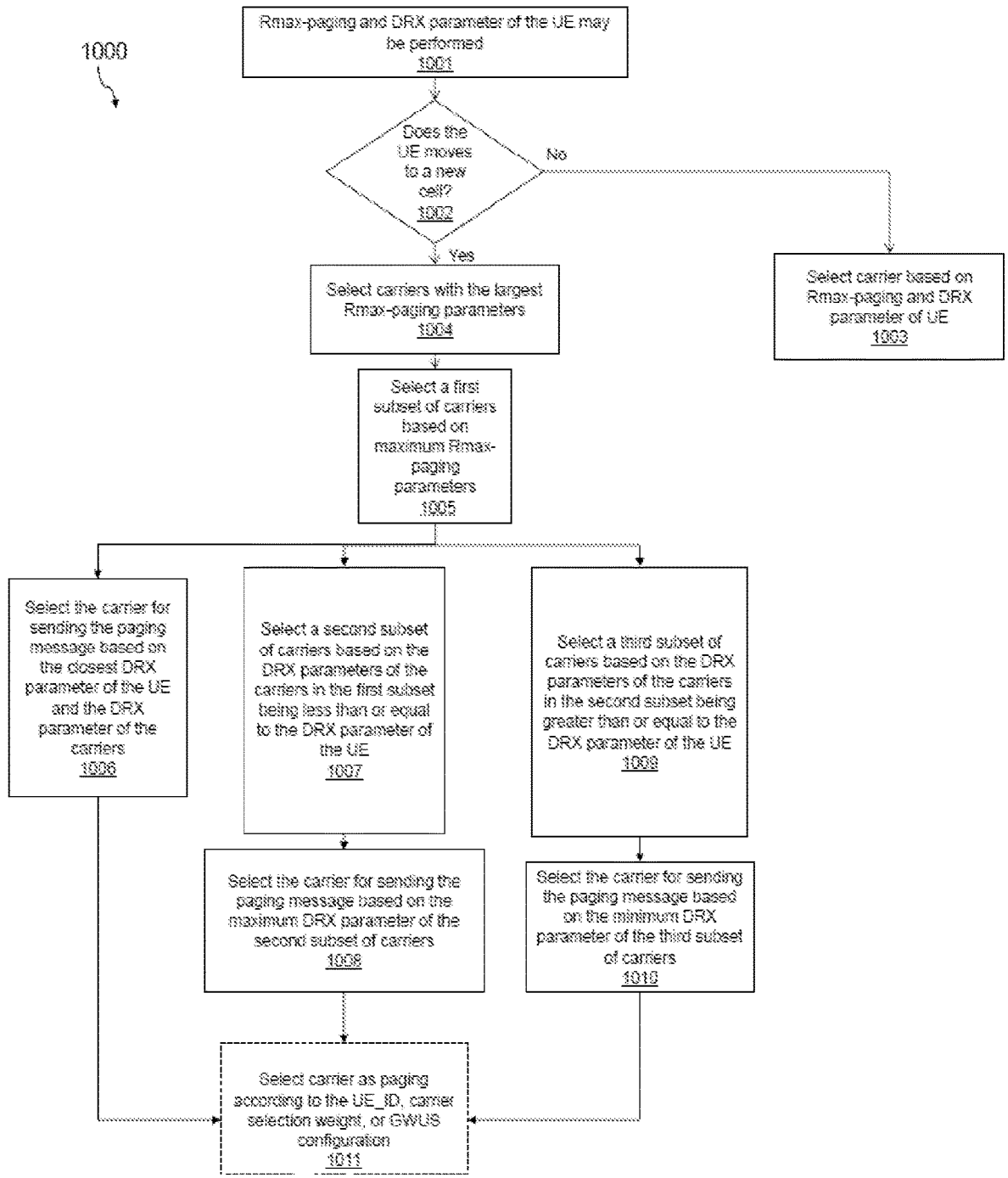
FIG. 10 illustrates an example method of selecting a carrier selection strategy using the Rmax-paging parameter (or CEL) and the DRX parameters of the carrier, in accordance with some implementations of the present disclosure.

FIG. 10 illustrates an example method 1000 of selecting a carrier selection strategy using the Rmax-paging parameter (or CEL) and the DRX parameters of the carrier, in accordance with some implementations of the present disclosure. As shown in step 1001, the paging carrier selection strategy based on Rmax-paging and DRX parameter of the UE may be activated (e.g., the network may be configured with the related parameters and the UE supports both carrier selection strategies such that selection strategies based on Rmax-paging parameters of the UE or DRX parameters of the UE may be performed).

As shown in step 1002, in the event the UE does not move to a new cell (e.g., the UE is in the same cell) or the paging cell is a not new cell (e.g., the paging cell is the same cell) then, as shown in step 1003, the paging carrier may be selected based on the DRX parameter for the UE and the Rmax-paging parameter.

Alternatively, in the event the UE moves to a new cell (e.g., the UE is not in the normally released cell) or the paging cell is a new cell (e.g., the paging cell is not the cell that the normally released cell) then the UE may select the paging carrier by selecting a carrier (or a subset of carriers) based on the carriers with the largest Rmax-paging parameters as shown in 1004.

As shown in step 1005, a first subset of carriers may be selected based on determining maximum Rmax-paging parameters. As shown in step 1006, a carrier may be selected for sending the paging message based on the carriers closest to the DRX parameter for the specific UE. The BS may select the closest carriers to the DRX parameter for the specific UE for sending paging messages to the UE based on the minimum absolute value of the difference between the DRX parameters for the specific UE and the DRX parameters for each of the configured carriers. The UE may select the same carrier resource as the BS.

Additionally or alternatively, as shown in step 1007, the BS may select a second subset of carriers based on the DRX parameters of the carriers in the first subset being less than or equal to the DRX parameter of the UE. As shown in step 1008, the BS may select the carrier for sending the paging message based on the maximum DRX parameter value of the second subset of carriers. The UE may select the same carrier resource as the BS.

Additionally or alternatively, as shown in step 1009, the BS may select the third subset of carriers based on the DRX parameters of the carriers in the second subset being greater than or equal to the DRX parameters of the UE. As shown in step 1010, the BS may select the carrier for sending the paging message based on the minimum DRX parameter value of the third subset of carriers. The UE may select the same carrier resource as the BS.

Additionally or alternatively, as shown in optional step 1011, in the event that the UE can monitor GWUS in the cell, the carrier may be selected for paging from the subsets based on at least one of the UE_ID, weights of each of the carriers, or GWUS configurations of the carriers.

In an example, an Rmax-paging parameter may of a UE may be 4 (e.g., Rmax-paging=4), the CEL of the UE may be CEL1, the DRX parameter of the UE may be rf64, and the UE may monitor GWUS in the cell. In the example, the UE moves to a new cell. The carriers may have the characteristics as described in Table 5 below.

TABLE 5

Carrier Configurations in an Example

| | CEL (Rmax-paging) | DRX cycle per carrier | GWUS configuration |
|---|---|---|---|
| Carrier 1 | CEL0 (1) | rf32 | Not configured |
| Carrier 2 | CEL0 (1) | rf64 | Configured |
| Carrier 3 | CEL1 (4) | rf64 | Not configured |
| Carrier 4 | CEL2 (16) | rf64 | Configured |
| Carrier 5 | CEL2 (16) | rf128 | Configured |
| Carrier 6 | CEL2 (16) | rf1024 | Not configured |

Given the example, a carrier for sending the paging message may be selected based on the carriers with the largest Rmax-paging parameter (e.g., carriers 4-6). The carrier with closest DRX parameter of the UE and the DRX parameter of carriers 4-6 may be selected. Accordingly, carrier 4 may be selected as the carrier sending the paging message and because the monitoring conditions have been satisfied, the UE may monitor GWUS.

Additionally or alternatively, a carrier for sending the paging message may be selected based on the closest DRX parameters of the carriers with the closest DRX parameter of the UE. In a next step of the carrier selection process, a carrier for sending the paging message may be selected based on the DRX parameters of the carriers being less than or equal to the DRX parameters of the UE. Subsequently, the carrier may be selected based on the carrier with the maximum DRX parameter. That is, carrier 4 is selected. Additionally or alternatively, a carrier for sending the paging message may be selected based on the carriers with the DRX parameter that is greater than or equal to the DRX parameter of the UE. Subsequently, the carrier may be selected based on the carrier with the minimum DRX parameter. That is, carrier 4 is selected. The UE may further select carriers based on the GWUS configuration. From the subset of carriers, the UE may select a carrier based on a UE_ID and/or a carrier weight.

As discussed herein, in the event the UE moves to a new cell, or the paging cell is a new cell, a paging carrier may be selected for sending a paging message based at least on a DRX parameter of the UE, the UE's paging carrier based on the UE_ID, and/or the GWUS resource groups.

Figure 11:
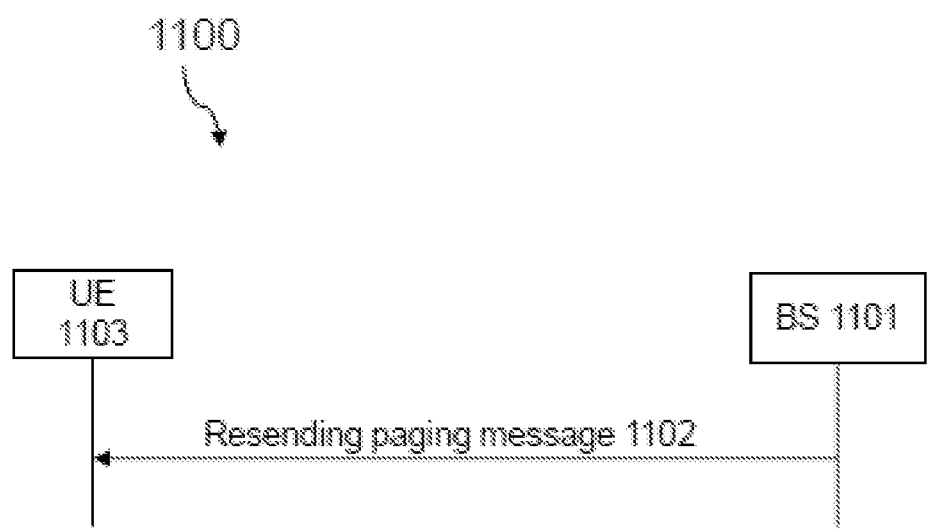
FIG. 11 illustrates an example method of a fallback strategy, in accordance with some implementations of the present disclosure.

In the event a carrier is selected, the BS may transmit a paging message to the UE over the selected carrier using the Rmax-paging parameter of the selected carrier. The UE may receive the paging message according to the selected carrier. FIG. 11 illustrates an example method 1100 of a fallback strategy, in accordance with some implementations of the present disclosure. In the event that an Rmax-paging parameter is configured for a carrier, a Rmax-paging-fallback parameter may also be configured. The Rmax-paging-fallback may be used for paging the UE again in the event the first paging fails. The Rmax-paging-fallback may be greater than the Rmax-paging parameter. The SIB may contain both the Rmax-paging parameter and the Rmax-paging-fallback parameter. Similarly, there may be a CEL-fallback parameter. The Rmax-paging-fallback parameter may be configured per cell or carrier.

In response to the BS determining that the paging message has failed, the BS may resend the paging message over the selected carrier with an updated Rmax-paging parameter that may be greater than the Rmax-paging parameter of the selected carrier. Additionally or alternatively, the BS may resend the paging message over the selected carrier with the Rmax-paging-fallback parameter (e.g. with an updated Rmax-paging parameter greater than the Rmax-paging parameter of the selected carrier). As shown, BS 1101 transmits a paging message 1102 according to Rmax-paging-fallback parameters to a UE 1103.

The UE may also determine that the UE has not received the paging message and attempt to receive a subsequent paging message over the selected carrier with an updated Rmax-paging parameter greater than the Rmax-paging parameter of the selected carrier. Additionally or alternatively, upon determining that the UE has not received the paging message, the UE may attempt to receive a subsequent paging message over the selected carrier based on a legacy paging carrier selection strategy In the event the cell changes or the UE moves, the Rmax-paging-fallback parameter may be used to monitor paging. Similarly, in the event the BS fails to page the UE (e.g., a paging message failure), the BS may use the Rmax-paging-fallback parameter to page the UE.

Figure 12:
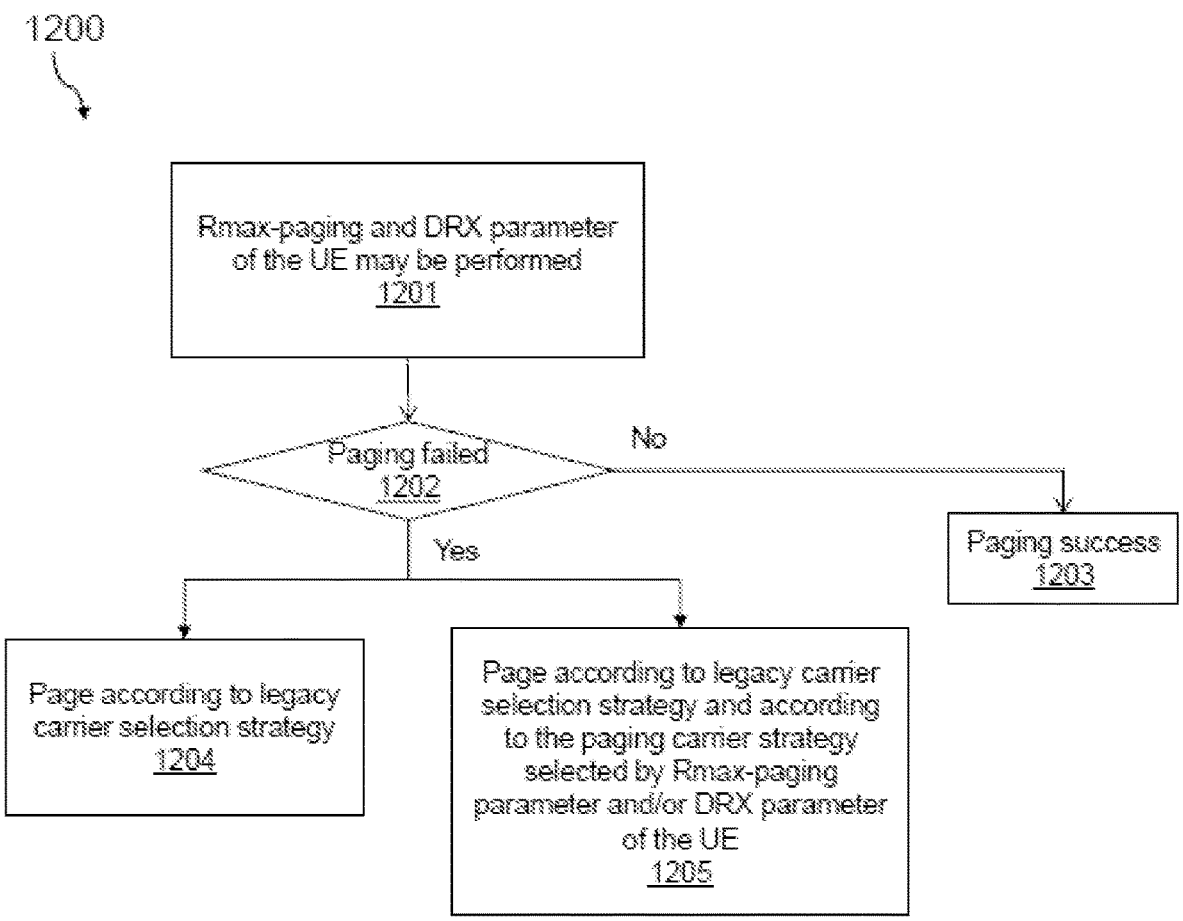
FIG. 12 illustrates an example method of a BS determining a paging success, in accordance with some implementations of the present disclosure.

FIG. 12 illustrates an example method 1200 of a BS determining a paging success, in accordance with some implementations of the present disclosure. As shown in step 1201, the paging carrier selection strategy based on Rmax-paging and/or DRX parameter of the UE may be performed. For example, the BS may be configured to select a paging carrier using a strategy based on Rmax-paging parameters of the UE and DRX parameters of the UE. In a different example, paging performed according to a carrier selection strategy (e.g., Rmax-paging) may have failed. In step 1202, the BS may determine whether the paging performed according to the carrier selection strategy (e.g., Rmax-paging parameter) may have failed. Additionally or alternatively, the BS may not determine that the paging has failed.

For instance, the carrier used by the UE may have failed. For example, the UE may have moved to another cell which may have resulted in the paging failing. Additionally or alternatively, the Rmax-paging parameter may have been too small. As shown in step 1203, if the paging message has not failed, the BS may determine that the paging was successful. In the event the BS has determined that the paging has failed, or is unable to determine that the paging was successful, as shown in step 1204, the BS may select a paging carrier selection strategy according to the legacy paging carrier selection strategy and use the legacy Rmax-paging parameters for paging. The paging carrier selection strategy according to the legacy paring carrier selection strategy may include not using the paging carrier selection strategy based on the Rmax-paging parameter (or CEL parameter) and/or not using the paging carrier selection strategy based on the DRX parameter of the UE. The BS may subsequently perform paging transmission and/or paging monitoring to determine whether the page was successful. Additionally or alternatively, as shown in step 1205, the BS may send a paging message on the paging carrier according to the carrier selection strategy as described herein using the Rmax-paging-fallback parameter (as shown in FIG. 11).

Additionally or alternatively, as shown in step 1205, the BS may send a paging message on both the legacy paging carrier (e.g., determined according to the legacy paging carrier selection strategy) and the paging carrier according to the carrier selection strategy as described herein.

Figure 13:
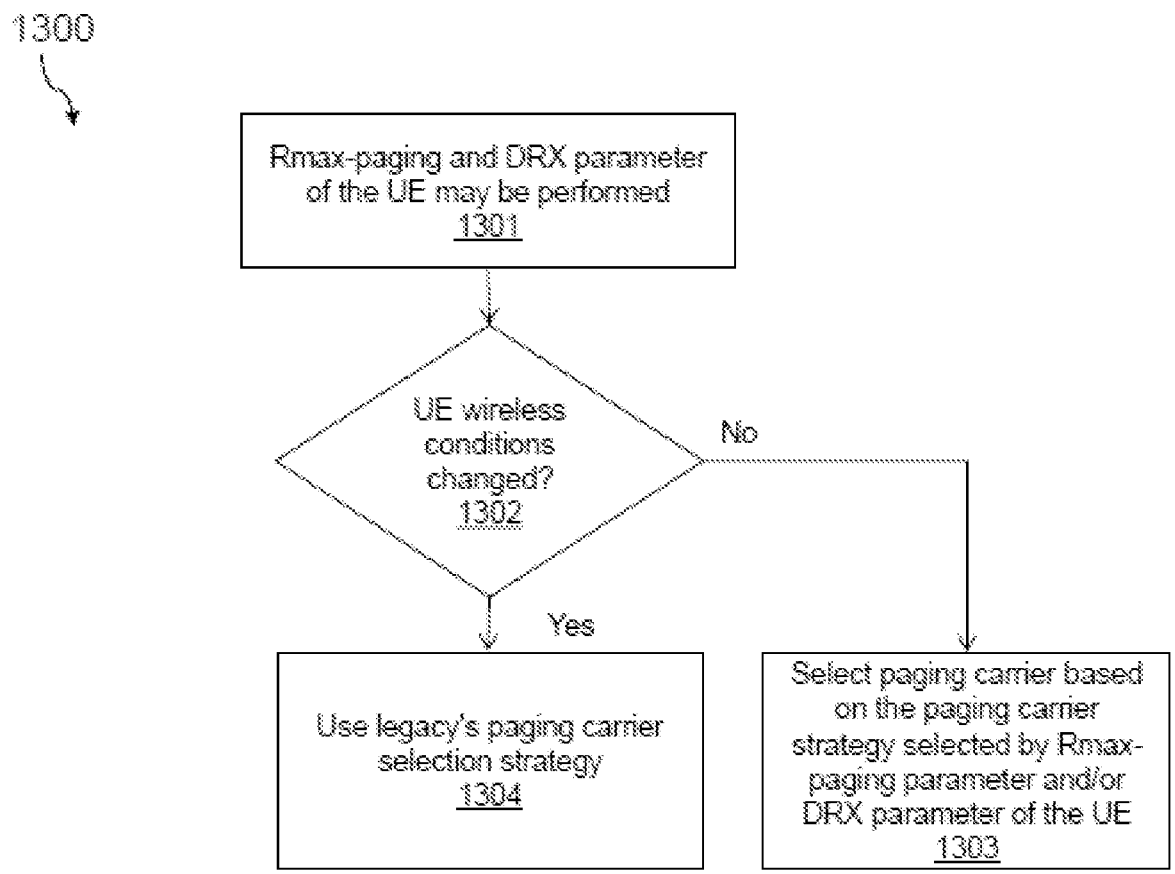
FIG. 13 illustrates an example method of a UE's wireless conditions changing, in accordance with some implementations of the present disclosure.

FIG. 13 illustrates an example method 1300 of a UE's wireless conditions changing, in accordance with some implementations of the present disclosure. As shown in step 1301, the paging carrier selection strategy based on Rmax-paging and/or DRX parameter of the UE may be activated (e.g., the network may be configured with the related parameters and the UE supports both carrier selection strategies such that selection strategies based on Rmax-paging parameters of the UE or DRX parameters of the UE may be performed) . . . . In step 1302, the UE may determine whether wireless conditions have changed (e.g., whether radio conditions have changed). A change of the UE's wireless conditions may include the UE determining that the Rmax-paging parameter required for the normal demodulation and scheduling of the PDCCH (CSS-paging) for paging has occurred based on, for instance, reference signal receive power (RSRP) measurements, received signal strength indicator (RSSI) measurements, reference signal received quality (RSRQ) measurements, signal to noise ratio (SINR) measurements, block error rate measurements, or other factors such as the UE selecting a new cell or moving.

As shown in step 1304, in the event that the wireless conditions have changed, the UE may use the legacy paging carrier selection strategy to select the paging carrier and monitor the paging message or select the paging carrier according to the carrier selection strategy as described herein with the Rmax-paging-fallback (as described in FIG. 11). As shown in step 1304, in the event that the wireless conditions have not changed, the UE may use the paging carrier selection strategy based on the Rmax-paging parameter and/or the DRX parameter of the UE to select the paging carrier and monitor the paging message, as discussed herein.

While various implementations of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one implementation can be combined with one or more features of another implementation described herein. Thus, the breadth and scope of the present disclosure should not be limited by any of the above-described illustrative implementations.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according implementations of the present solution.

Additionally, memory or other storage, as well as communication components, may be employed in implementations of the present solution. It will be appreciated that, for clarity purposes, the above description has described implementations of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method, comprising:
receiving, by a base station from an Access and Mobility Management Function (AMF), UE paging capability included in Core Network Assistance Information, via a Next Generation Application Protocol (NGAP) interface in a handover process,
wherein the UE paging capability comprises at least one of wakeup signals support capability, configuration related to wake up signal and extended Discontinuous Reception time (eDRX), group wakeup signals support capability, or group wakeup signals frequency hopping support, and
wherein the UE paging capability is for selecting paging resource for RAN paging; and selecting, by the base station, the paging resource for RAN paging according to the UE paging capability.

2. The wireless communication method of claim 1, wherein the UE paging capability is included in a handover request received by the base station from the AMF.

3. The wireless communication method of claim 1, wherein the UE paging capability is included in a path switch request acknowledge from the AMF.

4. The wireless communication method of claim 1, wherein the UE paging capability comprises multi-band support capability.

5. The wireless communication method of claim 1, wherein the UE paging capability further comprises at least one of:
UE category, coverage enhancement (CE) modeA support capability, or CE ModeB support capability.

6. A wireless communication method, comprising:
sending, by an Access and Mobility Management Function (AMF) to a base station, UE paging capability included in Core Network Assistance Information, via a Next Generation Application Protocol (NGAP) interface in a handover process,
wherein the UE paging capability comprises at least one of wakeup signals support capability, configuration related to wake up signal and extended Discontinuous Reception time (eDRX), group wakeup signals support capability, or group wakeup signals frequency hopping support, and
wherein the UE paging capability is used by the base station to select paging resource for RAN paging.

7. The wireless communication method of claim 6, wherein the UE paging capability is included in a handover request received by the base station from the AMF.

8. The wireless communication method of claim 6, wherein the UE paging capability is included in a path switch request acknowledge from the AMF.

9. The wireless communication method of claim 6, wherein the UE paging capability comprises multi-band support capability.

10. The wireless communication method of claim 6, wherein the UE paging capability further comprises at least one of:
UE category, coverage enhancement (CE) modeA support capability, or CE ModeB support capability.

11. A base station, comprising:
at least one processor configured to:
receive, via a receiver from an Access and Mobility Management Function (AMF), UE paging capability included in Core Network Assistance Information, via a Next Generation Application Protocol (NGAP) interface in a handover process,
wherein the UE paging capability comprises at least one of wakeup signals support capability, configuration related to wake up signal and extended Discontinuous Reception time (eDRX), group wakeup signals support capability, or group wakeup signals frequency hopping support, and
wherein the UE paging capability is for selecting paging resource for RAN paging; and
select the paging resource for RAN paging according to the UE paging capability.

12. The base station of claim 11, wherein the UE paging capability is included in a handover request received by base station from the AMF.

13. The base station of claim 11, wherein the UE paging capability is included in a path switch request acknowledge from the AMF.

14. The base station of claim 11, wherein the UE paging capability comprises multi-band support capability.

15. The base station of claim 11, wherein the UE paging capability further comprises at least one of:
UE category, coverage enhancement (CE) modeA support capability, or CE ModeB support capability.

16. An Access and Mobility Management Function (AMF), comprising:
at least one processor configured to:
send, via a transmitter to a base station, UE paging capability included in Core Network Assistance Information, via a Next Generation Application Protocol (NGAP) interface in a handover process,
wherein the UE paging capability comprises at least one of wakeup signals support capability, configuration related to wake up signal and extended Discontinuous Reception time (eDRX), group wakeup signals support capability, or group wakeup signals frequency hopping support, and
wherein the UE paging capability is used by the base station to select paging resource for RAN paging.

17. The AMF of claim 16, wherein the UE paging capability is included in a handover request received by the base station from the AMF.

18. The AMF of claim 16, wherein the UE paging capability is included in a path switch request acknowledge from the AMF.

19. The AMF of claim 16, wherein the UE paging capability comprises multi-band support capability.

20. The AMF of claim 16, wherein the UE paging capability further comprises at least one of:
UE category, coverage enhancement (CE) modeA support capability, or CE ModeB support capability.

* * * * *